(12) United States Patent
Li et al.

(10) Patent No.: US 8,705,554 B2
(45) Date of Patent: Apr. 22, 2014

(54) METHOD FOR REDUCING POWER CONSUMPTION OF WAPI MOBILE TERMINAL AND WAPI MOBILE TERMINAL

(75) Inventors: You Li, Shenzhen (CN); Jie Yang, Shenzhen (CN)

(73) Assignee: ZTE Corporation (CN)

( * ) Notice: Subject to any disclaimer, the term of this patent is extended or adjusted under 35 U.S.C. 154(b) by 64 days.

(21) Appl. No.: 13/260,080

(22) PCT Filed: Apr. 16, 2010

(86) PCT No.: PCT/CN2010/071823
§ 371 (c)(1),
(2), (4) Date: Nov. 14, 2011

(87) PCT Pub. No.: WO2010/133115
PCT Pub. Date: Nov. 25, 2010

(65) Prior Publication Data
US 2012/0106415 A1    May 3, 2012

(30) Foreign Application Priority Data
May 22, 2009   (CN) .......................... 2009 1 0202934

(51) Int. Cl.
*H04L 12/54*   (2013.01)
(52) U.S. Cl.
USPC ........................................ 370/429; 370/311
(58) Field of Classification Search
USPC ................ 370/310–350, 412, 419, 428, 429;
340/310–350, 412, 419, 428, 429
See application file for complete search history.

(56) References Cited

U.S. PATENT DOCUMENTS

| 6,219,728 B1* | 4/2001 | Yin ................................. 710/52 |
| 6,292,492 B1 | 9/2001 | Bonomi et al. |
| 2004/0267983 A1* | 12/2004 | Oda ................................. 710/56 |
| 2005/0138238 A1* | 6/2005 | Tierney et al. .................. 710/33 |
| 2007/0238437 A1 | 10/2007 | Jaakkola |
| 2012/0106415 A1* | 5/2012 | Li et al. ......................... 370/311 |

FOREIGN PATENT DOCUMENTS

| CN | 1578516 A | 2/2005 |
| CN | 100407696 C | 7/2008 |
| CN | 101588602 A | 11/2009 |

OTHER PUBLICATIONS

Wang, Xuerui, Authorized officer, The State Intellectual Property Office, P.R. China, International Searching Authority, International Application No. PCT/CN2010/071823; search date: May 21, 2010; mail date: Jul. 22, 2010.

* cited by examiner

*Primary Examiner* — Ricky Ngo
*Assistant Examiner* — Wei-Po Kao
(74) *Attorney, Agent, or Firm* — Kolisch Hartwell, P.C.

(57) ABSTRACT

A method for reducing power consumption of a Wireless Local Area Networks Authentication and Privacy Infrastructure (WAPI) mobile terminal and a WAPI mobile terminal are provided. Said method includes: caching received WAPI service data into a dynamic cache module, and in a process of caching WAPI service data, when data quantity of cached WAPI service data accumulates to a data quantity threshold set by said WAPI mobile terminal, a processor module of said WAPI mobile terminal processing the cached WAPI service data. Said WAPI mobile terminal includes: a WAPI communication module and a processor module connected with each other, and a storage module connected with said processor module, and a dynamic cache module connected with said WAPI communication module and said processor module respectively.

6 Claims, 3 Drawing Sheets

METHOD FOR REDUCING POWER CONSUMPTION OF WAPI MOBILE TERMINAL AND WAPI MOBILE TERMINAL

TECHNICAL FIELD

The present invention relates to the communication terminal field, and particularly, to a method for reducing power consumption of a mobile terminal and a Wireless Local Area Networks Authentication and Privacy Infrastructure (WAPI) mobile terminal.

BACKGROUND OF THE RELATED ART

After the Time Division-Synchronous Code Division Multiple Access (TD-SDCMA) technology of the 3rd Generation (3G) standards is commercialized, the China wireless network standard WAPI also emerges to the forefront along with the wireless city upsurge rising from various cities in China, and the mobile terminal supporting the WAPI function (namely the WAPI mobile terminal) becomes more and more popular.

In the mobile communication system, the continuous working time length of the mobile terminal is an important index reflecting the quality and performance of products. The mobile terminal downloading data through the WAPI technique during a long time will run out of the power of the battery quickly, and for the purpose of extending the continuous working time of the mobile terminal, it is necessary to reduce the power consumption of the mobile terminal.

As shown in FIG. 1, in the prior art, the WAPI mobile terminal comprises a processor module 101, a user interface module 102, a WAPI communication module 103 and a storage module 104. When the WAPI mobile terminal downloads the large flow and long time data, the processor module 101 of the mobile terminal is required to monitor the data sent by the WAPI communication module 103 all the time, and stores the data to the storage module 104 in real-time, and carries out related processing on the received data, and the above large quantity of data processing operations of the processor module 101 makes the working current of the mobile terminal keep in a higher constant value all the time, which causes the mobile terminal to severely consume the power.

SUMMARY OF THE INVENTION

The technical problem to be solved in the present invention is to provide a method for reducing power consumption of a WAPI mobile terminal and a WAPI mobile terminal, which saves the power consumption of the mobile terminal and extends the working time.

In order to solve the above problem, the present invention provides a WAPI mobile terminal for reducing power consumption, comprising: a WAPI communication module and a processor module connected with each other, and a storage module connected with said processor module, and a dynamic cache module connected with said WAPI communication module and said processor module respectively;

said dynamic cache module being configured to: receive and cache WAPI service data sent by said WAPI communication module; and after data quantity of cached WAPI service data accumulates to a data quantity threshold set by said processor module, send a triggering message to said processor module to notify said processor module to carry out processing.

In the above WAPI mobile terminal, the following characteristics are further included:

said processor module is configured to: set the data quantity threshold of cache storage; in a process of caching WAPI service data, not monitor and process the WAPI service data; and after receiving the triggering message of said dynamic cache module, process the WAPI service data cached by said dynamic cache module.

In the above WAPI mobile terminal, the following characteristics are further included:

said processor module is configured to: keep in a sleeping state or process a task of which a processing priority is higher than the processing priority of said WAPI service in a process of caching WAPI data.

In the above WAPI mobile terminal, the following characteristics are further included:

said processor module is configured to: set the data quantity threshold of the cache storage according to a real-time requirement of the WAPI service, and the higher the real-time requirement of the WAPI service is, the lower the set data quantity threshold is.

In the above WAPI mobile terminal, the following characteristics are further included:

said processor module is further configured to: move the cached WAPI service data to said storage module after the data quantity of the cached WAPI service data accumulates to said data quantity threshold, and enter into the sleeping state over again or continue to process a task of which the processing priority is higher than the processing priority of said WAPI service.

In the above WAPI mobile terminal, the following characteristics are further included:

said dynamic cache module is a Field Programmable Gate Array.

In order to solve the above problem, the present invention also provides a method for reducing power consumption of a Wireless Local Area Networks Authentication and Privacy Infrastructure (WAPI) mobile terminal, comprising:

caching received WAPI service data into a dynamic cache module, and when data quantity of cached WAPI service data accumulates to a data quantity threshold set by said WAPI mobile terminal, a processor module of said WAPI mobile terminal processing the cached WAPI service data.

The above method further comprises:

in a process of caching WAPI data, said processor module not monitoring and processing the WAPI service data, and said processor module being in a sleeping state or processing a task of which a processing priority is higher than the processing priority of said WAPI service.

In the above method, the following characteristics are further included:

said data quantity threshold is set by the WAPI mobile terminal according to a real-time requirement of a WAPI service, and the higher the real-time requirement of the WAPI service is, the lower the set data quantity threshold is.

The above method further comprises:

after the data quantity of the cached WAPI service data accumulates to said data quantity threshold, said processor module moving the cached WAPI service data to a storage module of said WAPI mobile terminal, and entering into the sleeping state over again or continuing to process a task of which the processing priority is higher than the processing priority of said WAPI service.

In the method of the present invention, the WAPI mobile terminal adds a dynamic cache module, and when the mobile terminal carries out WAPI data downloading operations of lower real-time requirement and large data quantity, in the time consuming process of caching the data to the dynamic cache module, the processor of the mobile terminal doesn't need to monitor and process the data in the dynamic cache module, and further uniformly processes the data until the data accumulated in the dynamic cache module reaches to the quantity set by system, and thus the whole power consumption of the mobile terminal can be effectively reduced, and the working quantity of the processor is reduced, and further the power of the mobile terminal is saved, and the continuous using time of the mobile terminal is extended.

PREFERRED EMBODIMENTS OF THE PRESENT INVENTION

Figure 1:
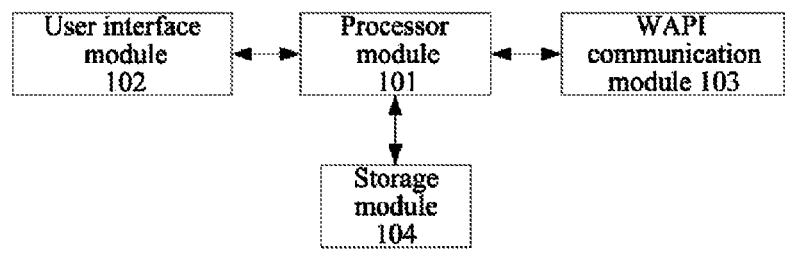
FIG. 1 is a function structure diagram of the WAPI mobile terminal in the prior art.
Figure 2:
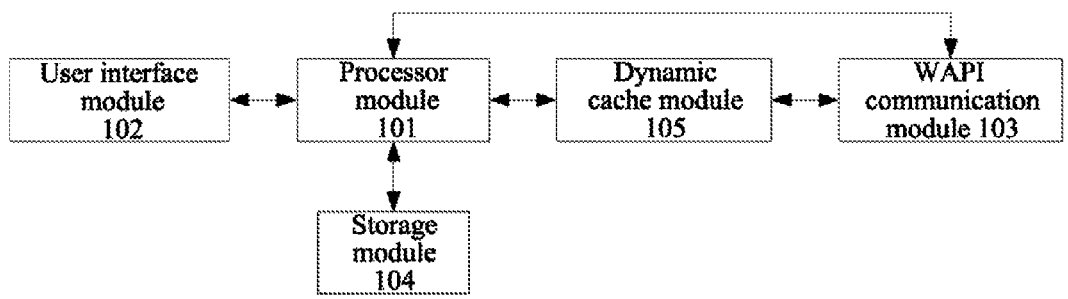
FIG. 2 is a function structure diagram of the WAPI mobile terminal of which the power consumption can be reduced according to the example.

As shown in FIG. 2, comparing with the WAPI mobile terminal shown in FIG. 1, the WAPI mobile terminal of which the power consumption is reduced adds a dynamic cache module 105 respectively connected with the processor module 101 and the WAPI communication module 103;

the user interface module 102 is used for data interaction between the man-machine interacting device and the processor module 101; wherein the man-machine interacting device of the mobile terminal is a terminal screen and a keyboard;

the WAPI communication module 103 is used for carrying out data interaction with a wireless access node of a WAPI network by the WAPI protocol, and sending the WAPI data received from the wireless access node to the processor module 101 or the dynamic cache module 105;

the storage module 104 is used for storing WAPI data under the control of the processor module 101;

the processor module 101 is used for controlling the normal operation of the whole system, receiving the input of the external control signal, and processing the WAPI transmission data; is further used for setting the data quantity threshold of the cache storage according to the real-time requirement of the WAPI service, wherein the higher the real-time requirement of the WAPI service is, the lower the set data quantity threshold is; is further used for in the process of caching the WAPI service data, enter into a sleeping state or process the task of which the priority is higher than that of said WAPI service, not monitoring or processing WAPI service data; and is further used for moving cached WAPI service data to said storage module after receiving the triggering message of said dynamic cache module, namely after the data quantity of the cached WAPI service data accumulates to said data quantity threshold, and entering into the sleeping state over again or continuing to process the task of which the priority is higher than that of said WAPI service;

the dynamic cache module 105 is used for receiving and caching the WAPI service data sent by said WAPI communication module; and is further used for sending a triggering message to said processor module 101 after the data quantity of the cached WAPI service data accumulates to the data quantity threshold set by said processor module;

this dynamic cache module 105 can be a Field Programmable Gate Array (FPGA) chip with low power consumption, and the Random Access Memory (RAM) inside the FPGA chip stores the cached WAPI data.

According to the real-time requirement of the WAPI service, the WAPI mobile terminal sets the data quantity threshold of the cache storage (namely the dynamic cache module), and the higher the real-time requirement of the WAPI service is, the lower the data quantity threshold of the cache storage is. For example, for the WAPI service which is required to be played in streaming media, the real-time requirement of the data transmission is very high, and the user can set a very low data quantity threshold of the cache storage, or directly set to 0, namely not caching this WAPI service data, and directly caching data by the small capacity RAM inside the processor. For the WAPI service which requires downloading file packets in a large quantity and not paying attention to the downloading content, the user can set a very high data quantity threshold of the cache storage.

Figure 3:
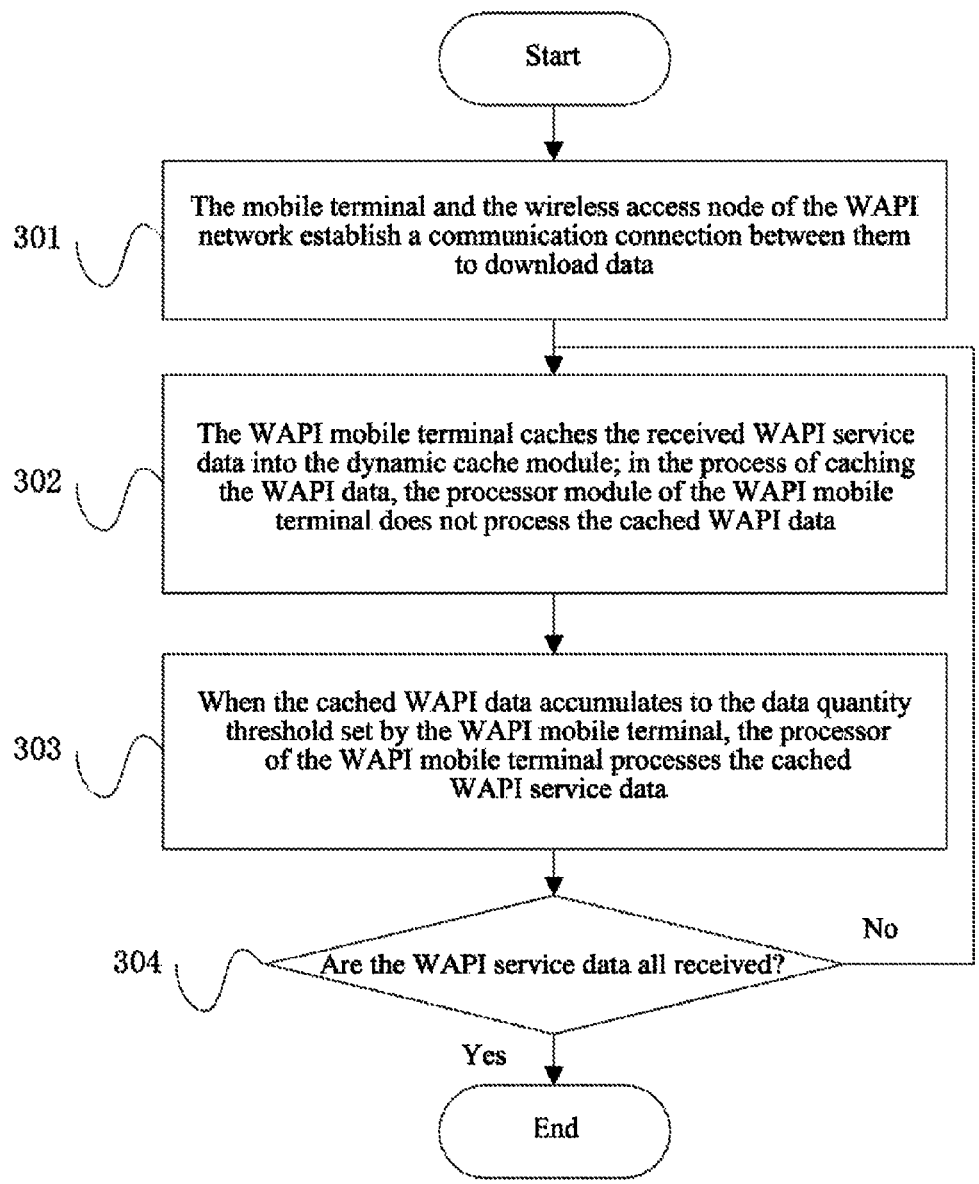
FIG. 3 is a flow chart of the method for reducing the power consumption of the WAPI mobile terminal according to the example.

As shown in FIG. 3, the method for reducing power consumption of the WAPI mobile terminal comprises:

step 310, the mobile terminal and the wireless access node of the WAPI network establish a communication connection between them to download data;

step 302, the WAPI mobile terminal caches the received WAPI service data into the dynamic cache module; in the process of caching the WAPI data, the processor module of the WAPI mobile terminal does not process the cached WAPI data;

in the process of caching the WAPI data, the processor judges that except the WAPI service, there is no other task of which the priority is higher than that of the WAPI service running, and the processor enters into the sleeping or low power consumption state; the processor judges that besides wireless communication of the WAPI, there is currently another task of which the priority is higher than that of the WAPI service running, and the processor processes this task of which the priority is higher than that of the WAPI service.

Step 303, when the cached WAPI data accumulates to the data quantity threshold set by the WAPI mobile terminal, the processor of the WAPI mobile terminal processes the cached WAPI service data;

when the cached WAPI data accumulates to the data quantity threshold set by the WAPI mobile terminal, and when the dynamic cache module sends the triggering message to the processor, and if the processor is in the sleeping state, then the processor quits the sleeping state, and moves the WAPI data in the dynamic cache module to the storage module; if the processor is processing another task of which the priority is higher than that of the WAPI service, then after finishing this task, the processor further moves the WAPI data inside the dynamic cache module to the storage module, or after receiving the triggering message, the processor suspends processing of this task, and moves the WAPI data in the dynamic cache module to the storage module.

Step 304, the processor judges whether the WAP service data are all received, and if yes, the flow ends, otherwise the step 302 is carried out to continue to receive the WAPI service data.

According to the above method, if the user downloads the WAPI service with the large flow quantity data and not high real-time requirement through the WAPI, the processor doesn't need to monitor and carry out the downloading operation of the data all the time, but caches the WAPI service data in the dynamic cache module, and when the stored data in the cache area reach to a certain value, the processor further moves the data to the storage space, and in the process of caching the WAPI service data, the processor does not monitor and process cached data, and thus in the time consuming process of caching the WAPI data, the processor doesn't need to consume the processing capability on the WAPI service, thereby saving the power; especially for the case of the larger downloaded WAPI service data quantity and consuming longer downloading time, the effect is obvious.

It will further describe the specific example of the present invention in detail in combination with the figures below.

Figure 4:
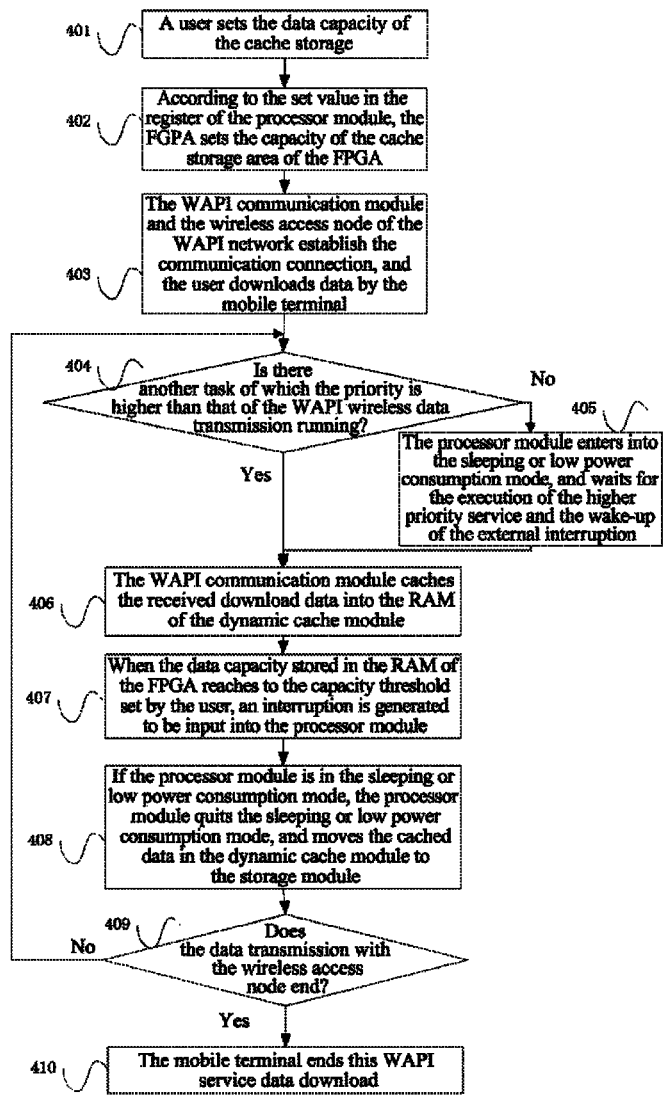
FIG. 4 is a flow chart of the method for reducing the power consumption of the WAPI mobile terminal according to the specific example.

As shown in FIG. 4, combining with FIG. 2, the dynamic cache module 105 of the mobile terminal is a FPGA chip, and the method of the WAPI mobile terminal processing WAPI service data comprises:

step 401, according to their own application requirements, the user sets the data capacity of the cache storage area in the FPGA according to the real-time requirement of the WAPI service through the Man-Machine Interacting (MMI) devices, the set value is input into the register of the processor module 101 through the user interface module 102 of the mobile terminal;

for example, when the real-time requirement of the WAPI service is very high, the data capacity of the FPGA can be set to 0, and when the real-time requirement of the WAPI service is low, for the purpose of saving power of the mobile terminal to the maximum, the user can set the data capacity of the FPGA to the maximum capacity of the cache storage.

Step 402, according to the set value in the register of the processor module 101, the FGPA sets the capacity of the cache storage area of the FPGA;

step 403, the WAPI communication module 103 and the wireless access node of the WAPI network establish the communication connection between them, and the user downloads data by the mobile terminal;

step 404, the processor module 101 judges whether there is another task of which the priority is higher than that of the WAPI service running besides the WAPI communication module 103 being carrying out the wireless data transmission, and if yes, step 406 is carried out, otherwise step 405 is carried out;

step 405, the processor module 101 enters into the sleeping or low power consumption mode, and waits for the execution of the higher priority service and the wake-up of the external interruption;

step 406, the WAPI communication module 103 of the mobile terminal caches the received download data into the RAM of the dynamic cache module 105;

step 407, when the data capacity stored in the RAM of the FPGA reaches to the capacity threshold set by the user, an interruption is generated to be input into the processor module 101;

step 408, if the processor module 101 is in the sleeping or low power consumption mode, the processor module 101 will quit the sleeping or low power consumption mode, and move the cached data in the FPGA to the storage module 104;

step 409, the processor module 101 judges whether the data transmission between the WAPI communication module 103 and the wireless access node of the WAPI network ends, and if yes, step 410 is carried out, otherwise step 404 is carried out;

step 410, the mobile terminal ends this data downloading service.

In the above implementation way, due to the setup of the dynamic cache module between the processing module and the WAPI communication module, the processor module doesn't need to process the WAPI service data sent by the WAPI communication module in real-time. The above method also sets the data quantity threshold, and before the WAPI service data cached by the dynamic cache module reaches to the data quantity threshold, the processor module is able to not process the WAPI service data cached in the dynamic cache module, thereby saving the power of the terminal and reducing the power consumption of the terminal. But the present invention is not limited to the above one way, and in other examples, the processor doesn't need to wait for the WAPI service data cached in the dynamic cache module reaching to the data quantity threshold in order to process data, and before reaching to the data quantity threshold, the processor can also carry out one or more times, regular or irregular discontinuous processing on the cached data as long as the processor doesn't need to process cached data in real-time, and the present invention does not limit the specific implementation method.

Certainly, the present invention can also have other various examples, and without departing from the spirit or essence of the present invention, the person skilled in the art can make various corresponding modifications and transformations according to the present invention. And all the modifications and transformations shall all fall into the protection scope of the appended claims of the present invention.

INDUSTRIAL APPLICABILITY

In the method of the present invention, the WAPI mobile terminal adds a dynamic cache module, and when the mobile terminal carries out WAPI data downloading operations of lower real-time requirement and large data quantity, and in the time consuming process of caching the data into the dynamic cache module, the processor of the mobile terminal doesn't need to monitor and process the data in the dynamic cache module, and further uniformly processes the data until the data accumulated in the dynamic cache module reaches to the quantity set by system, and thus the whole power consumption of the mobile terminal can be effectively reduced, and the working quantity of the processor is reduced, and further the power of the mobile terminal is saved, and the continuous using time of the mobile terminal is extended.

What is claimed is:

1. A Wireless Local Area Networks Authentication and Privacy Infrastructure (WAPI) mobile terminal of which power consumption is reduced, comprising: a WAPI communication module and a processor module connected with each other, and a storage module connected with said processor module, and a dynamic cache module connected with said WAPI communication module and said processor module respectively; wherein said dynamic cache module is configured to: receive and cache WAPI service data sent by said WAPI communication module; and after data quantity of cached WAPI service data accumulates to a data quantity threshold set by said processor module, send a triggering message to said processor module to notify said processor module to carry out processing, and said processor module is configured to: set the data quantity threshold of cache storage; before data quantity of cached WAPI service data accumulates to the data quantity threshold, not monitor and not process the WAPI service data; after receiving the triggering message of said dynamic cache module; process the WAPI service data cached by said dynamic cache module; set the data quantity threshold of the cache storage according to a real-time requirement of the WAPI service, and the higher the real-time requirement of the WAPI service is, the lower the set data quantity threshold is.

2. The WAPI mobile terminal as claimed in claim 1, wherein
said processor module is configured to: keep in a sleeping state or process a task of which a priority is higher than that of said WAPI service in a process of caching WAPI data.

3. The WAPI mobile terminal as claimed in claim 2, wherein
said processor module is further configured to: move the cached WAPI service data to said storage module after the data quantity of the cached WAPI service data accumulates to said data quantity threshold, and enter into the sleeping state over again or continue to process the task of which the priority is higher than that of said WAPI service.

4. The WAPI mobile terminal as claimed in claim 1, wherein
said dynamic cache module is a Field Programmable Gate Array.

5. A method for reducing power consumption of a Wireless Local Area Networks Authentication and Privacy Infrastructure (WAPI) mobile terminal, comprising:

caching received WAPI service data into a dynamic cache module, and when data quantity of cached WAPI service data accumulates to a data quantity threshold set by said WAPI mobile terminal, a processor module of said WAPI mobile terminal processing the cached WAPI service data, and in a process of caching WAPI data, before data quantity of cached WAPI service data accumulates to the data quantity threshold, said processor module not monitoring and processing the WAPI service data, and said processor module being in a sleeping state or processing a task of which a priority is higher than that of said WAPI service, wherein said data quantity threshold is set by the WAPI mobile terminal according to a real-time requirement of a WAPI service, and the higher the real-time requirement of the WAPI service is, the lower the set data quantity threshold is.

6. The method as claimed in claim 5, said method further comprising:
after the data quantity of the cached WAPI service data accumulates to said data quantity threshold, said processor module moving the cached WAPI service data to a storage module of said WAPI mobile terminal, and entering into the sleeping state over again or continuing to process the task of which the priority is higher than that of said WAPI service.

* * * * *